United States Patent
Teterud

(10) Patent No.: US 6,549,353 B1
(45) Date of Patent: Apr. 15, 2003

(54) OVERSHOOT CONTROL FOR A HARD DISK DRIVE WRITE HEAD

(75) Inventor: Patrick M. Teterud, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/474,958

(22) Filed: Dec. 30, 1999

(51) Int. Cl.[7] .............................. G11B 5/02; G11B 5/09
(52) U.S. Cl. ........................................ 360/46; 360/68
(58) Field of Search .......................... 360/46, 68, 67; 327/379, 310, 328, 392, 424, 110, 108

(56) References Cited

U.S. PATENT DOCUMENTS

| | | | |
|---|---|---|---|
| 5,781,046 A | * | 7/1998 | Ngo et al. ................... 327/110 |
| 5,923,183 A | * | 7/1999 | Kim et al. ..................... 326/27 |
| 6,052,017 A | * | 4/2000 | Pidutti et al. ................ 327/424 |
| 6,271,978 B1 | * | 8/2001 | Block et al. ................... 360/46 |

* cited by examiner

Primary Examiner—David Hudspeth
Assistant Examiner—Varsha A. Kapadia
(74) Attorney, Agent, or Firm—Bret J. Petersen; W. James Brady; Frederick J. Telecky

(57) ABSTRACT

An improved write drive circuit which includes a discharge circuit added to the base of the bottom transistors of the H-bridge to prevent excessive overshoot and ringing while allowing for higher data rates. The discharge circuit is turned on after the head voltage or current reaches an overshoot condition. In preferred embodiments, the discharge circuit includes variable discharge capability by selecting one or more parallel drive transistors or varying a variable delay in the discharge circuit or any combination of both variables. Both can be controlled by a word written to the disk drive pre-amp over the serial control port.

17 Claims, 3 Drawing Sheets

OVERSHOOT CONTROL FOR A HARD DISK DRIVE WRITE HEAD

FIELD OF THE INVENTION

The present invention relates to the write driver circuit for a hard disk drive (HDD). More particularly, it relates to a hard disk drive write head and circuits for controlling the overshoot of the write head drive current to optimize the rise time and fall time and other characteristics of the write to disk operation.

BACKGROUND OF THE INVENTION

A hard disk drive storage system typically includes one or more rotating disks, or platters having magnitizible material coated on their surfaces. Read/write heads associated with each platter surface move together radially across the head to reach addressable data regions located on concentric circles called tracks. It is now common to have separate read and write heads. The write head is essentially a small coil of wire which stores data by magnetizing small regions of the disk platter along the tracks. A current driven through the write head creates a temporary magnetic field which magnetizes a small region of the disk at the current position of the write head.

The electronic circuitry used to drive current through the write head typically uses an H-bridge as shown in FIG. 1. For example, U.S. Pat. No. 5,638,012, issued to Hashimoto et al. and incorporated herein by reference, uses an H-bridge for a write driver circuit. The purpose of the H-bridge is to allow electric current to be driven through the write head in either direction. When the current is driven in one direction a magnetic field is created with the north pole in one direction, and when the current is driven in the opposite direction, a magnetic field is created with the north pole in the opposite direction. The H-bridge operates to switch the drive current through the head by turning on a pair of transistors to allow current to flow in a path from a supply source to ground. For example, current flows through the write head from Hx to Hy when transistors Y are turned on and transistors $\overline{Y}$ are turned off. Similarly, current flows the opposite direction when transistors $\overline{Y}$ are turned on and transistors Y are turned off. The tr, tf (rise time, fall time) is the time corresponding to the speed at which current can reverse through the inductive load of the HDD write head.

It is desirable to increase the speed of the change of current flow to increase the amount of data that can be stored on a single track of the HDD platter. A limitation to decreasing the tr, tf is limiting the amount of current overshoot and the ringing period. FIG. 2 illustrates the current waveform for a test input to a typical prior HDD write head. As the switching speed of the current through the head is increased, the current and voltage overshoot, above the steady state value, increases at the head. While some overshoot can be tolerated, too much overshoot in some applications can have deleterious effects, such as write asymmetry, on the head and consequently the overall drive system performnance. For example, increased overshoot will increase the time for the head current to settle to its steady state value, while it is desirable to have the current settle as quickly as possible.

The prior art circuit provided enhanced drive and the accompanying overshoot by adding capacitors 16, 18 as shown in FIG. 1. In this circuit, at the beginning of the current transitions, additional current is passed through the write head from an initial increase in charge at the bases of the lower transistors supplied by capacitors 16, 18. The increase in initial charge at the bases increased the speed of the write current transitions. The prior art was further enhanced with programmable capacitors to control the overshoot.

SUMMARY OF THE INVENTION

In the prior art, the added overshoot resulting from the faster write transitions has undesirable effects. In the present invention, a discharge circuit is added to the base of the bottom transistors of the H-bridge to prevent excessive overshoot and ringing while allowing for faster write transitions.

In another embodiment of the present invention, an adjustable overshoot circuit includes a variable delay.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

Figure 1:
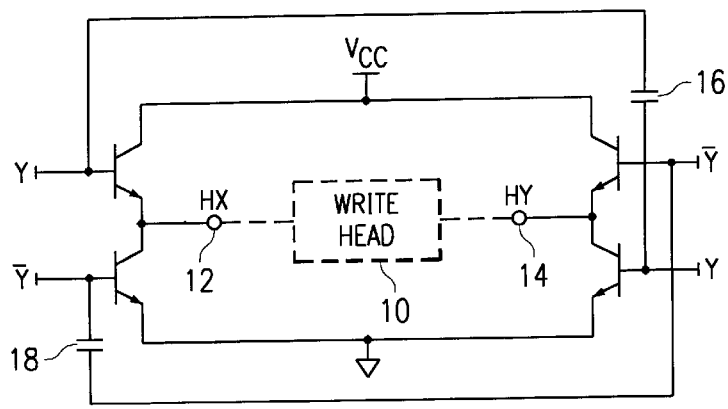
FIG. 1 Represents an H-bridge driver circuit according to the prior art.

As discussed above, the electronic circuitry used to drive current through a HDD write head typically uses an H-bridge as shown in the prior art circuit of FIG. 1. This figure represents a simplified circuit of the write driver, sometimes referred to as the "writer" circuit. Typically the write driver circuit includes additional circuitry for driving the Y and $\overline{Y}$ inputs, with the top two or bottom two transistors setting the steady state current value. See for example, U.S. Pat. No. 5,638,012 referenced above. The purpose of the H-bridge is to allow electric current to be driven through the write head in either direction. When the current is driven in one direction a magnetic field is created with the north pole in one direction, and when the current is driven in the opposite direction, a magnetic field is created with the north pole in the opposite direction. The magnetic field is then used to "write" data to the disk platter by magnetizing a small region on the disk platter.

The H-bridge operates to switch the drive current through the head by turning on a pair of transistors to allow current to flow in a path from a supply source to ground. For example, current flows through the write head from Hx to Hy when transistors Y are turned on and transistors $\overline{Y}$ are turned off. Similarly, current flows in the opposite direction when transistors $\overline{Y}$ are turned on and transistors Y are turned off. The DC operating point of the write head is the voltage at either side of the head when the steady-state current is flowing through the head.

Figure 2:
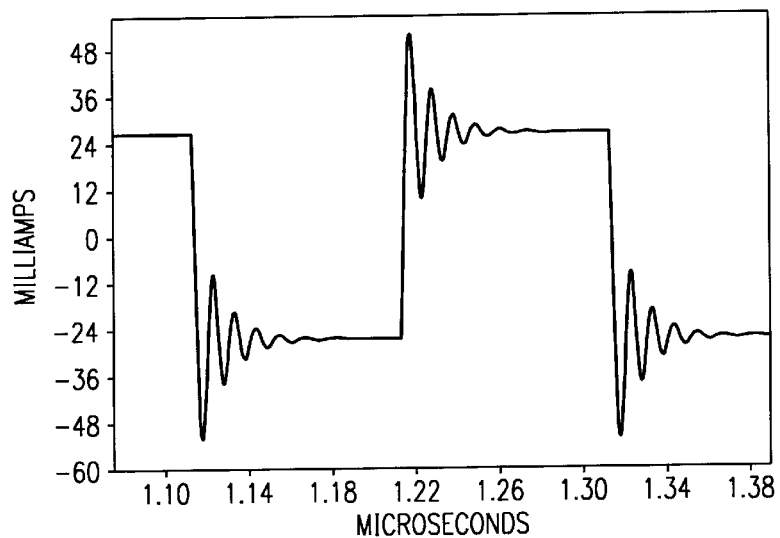
FIG. 2 Shows the response of a current transition from the H-bridge driver circuit of FIG. 1 according to the prior art.

Since the HDD write head is an inductive load, there are voltage and current swings (a characteristic transient ring) at the Hx and Hy outputs when the current through the head is reversed rapidly as shown in FIG. 2. It is desirable to increase the write frequency of the write head current transition for higher data rates. To achieve this without adverse effects, the ringing period and current overshoot at the Hx and Hy write outputs should be reduced and controlled.

Figure 3:
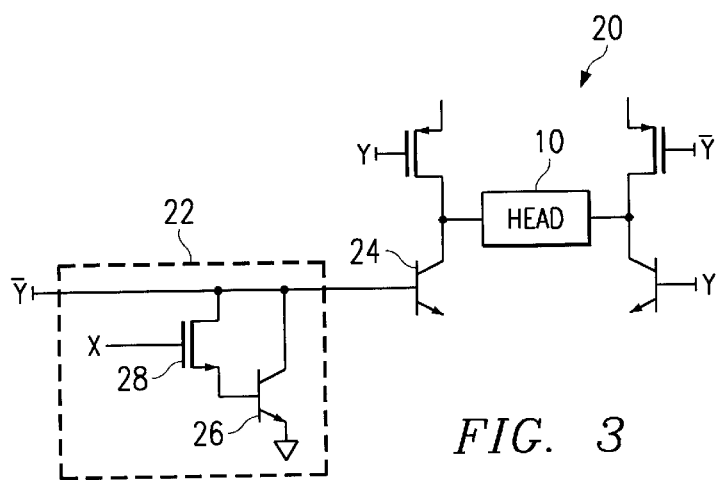
FIG. 3 Shows an overshoot control circuit for a write driver according to an embodiment of the present invention.

FIG. 3 illustrates a simplified write driver circuit according to an embodiment of the present invention. The write driver circuit includes an H-drive circuit 20 as described above, and a discharge circuit 22. In this embodiment, the H-drive circuit 20 includes P-MOS transistors in place of the NPN transistors shown in FIG. 1. The discharge circuit 22 provides a discharge path from the base of H-bridge 20 NPN 24 to ground that limits the current overshoot and allows a faster settling time. This results in maximizing write frequency and minimizing write asymmetry.

In the embodiment of FIG. 3, the discharge circuit 22 includes an NPN transistor 26 with the collector connected to the base of the H-bridge transistor 24 and the emitter connected to ground. The base of NPN transistor 26 may be controlled by N-MOS transistor 28. In this embodiment, N-MOS transistor 28 has a drain connected to the base of transistor 24 and source connected to the base of transistor 26. The gate of transistor 28 has an input signal X, which is a pulse that drives the discharge circuit. The operation of the circuit is described below with reference to FIGS. 4(a–c).

Figure 4A:
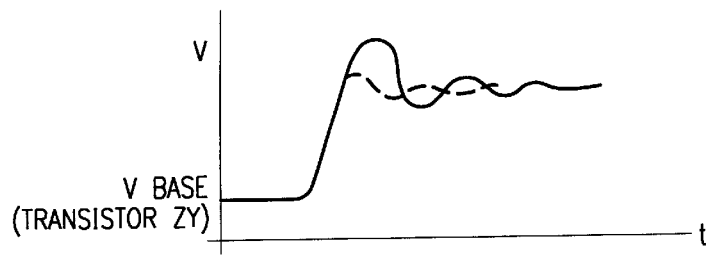
FIG. 4 Shows timing diagrams for an embodiment of the present
Figure 4B:
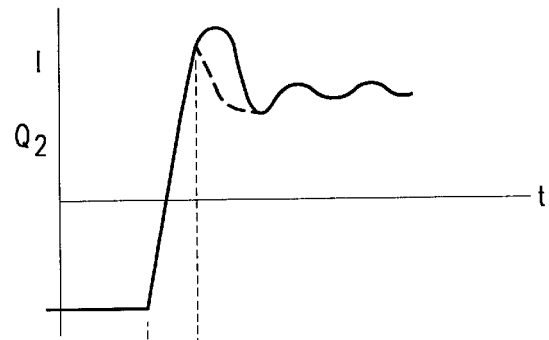
Figure 4C:
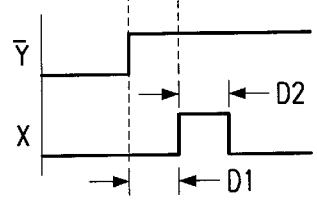

FIGS. 4(a–c) show the voltage, current, and timing diagrams for the circuit described above and shown in FIG. 3. The current drive of transistor 24 represented in FIG. 4b is controlled by its base voltage. Current and voltage ringing are due to the inductive load of head 10 during a current reversal through the head. FIGS. 4a and 4b show the base voltage and current for transistor 24 without discharge circuit 22 shown in the heavy lines. It is desirable to reduce the drive current overshoot and ringing without increasing the rise time. After reaching the appropriate drive current level, the present invention discharges a portion of the base voltage on transistor 24 which begins decreasing the drive current. The reduction in drive current has the effect of decreasing the ringing period and current overshoot. Circuit 22 of FIG. 3 is an NPN transistor connected to discharge voltage from the base of transistor 24 when turned on by transistor 28. FIG. 4c shows input X which turns N-MOS transistor 28 on at a delay D1 after $\overline{Y}$ goes high. X turns on transistor 28 for a time D2. The discharge circuit quickly reduces the base voltage of transistor 24 after X goes high and consequently reduces the overshoot of the drive current as shown by the dashed line-in FIGS. 4a and 4b.

Figure 5:
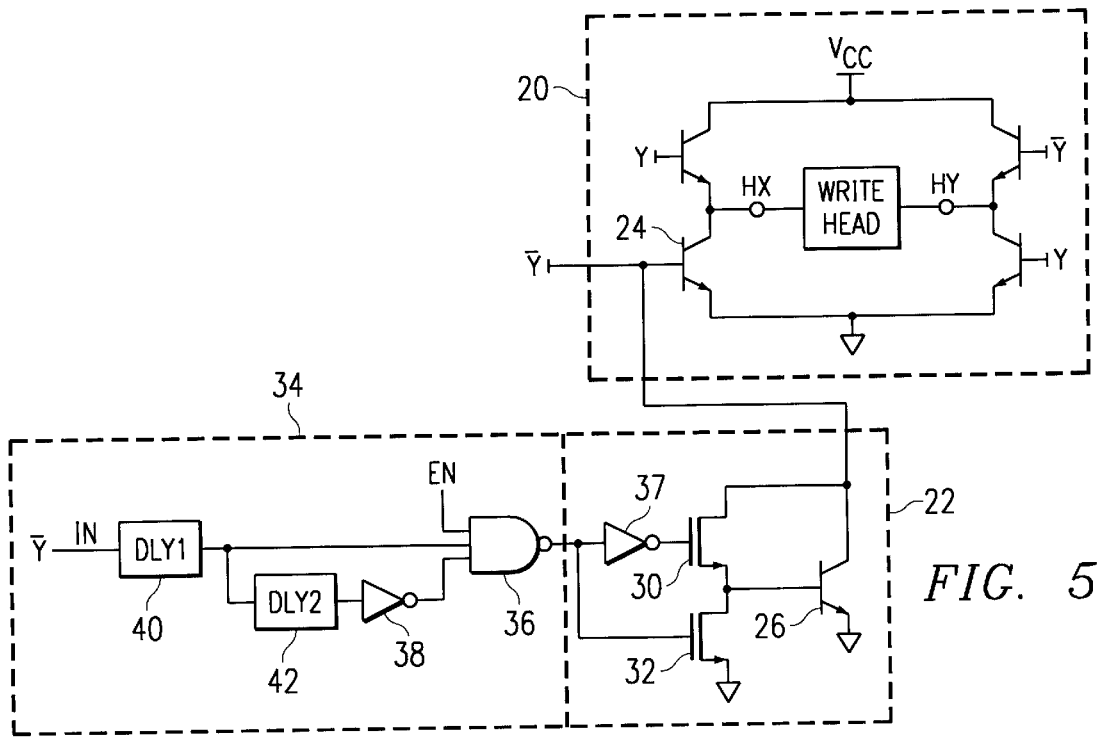
FIG. 5 Shows another embodiment of the present invention.

Another embodiment of the present invention is illustrated in FIG. 5. The circuit includes the H-drive circuit 20 described above, and a modified version of discharge circuit 22. In this embodiment, the discharge circuit 22 includes an NPN discharge transistor 26 collector connected to the base of the H-bridge transistor 24 and emitter connected to ground. The base of NPN transistor 26 is controlled by an N-MOS transistor pair 30,32. In this embodiment, the N-MOS transistor 30 has a drain connected to the base of transistor 24 and source connected to the base of transistor 26. The source of transistor 32 is connected to ground and drain connected to the base of transistor 26. The gates of transistors 30,32 are ultimately controlled by a pulse circuit 34 whose output is Nand gate 36. Transistor 30 is driven by the inverted output signal of Nand gate 36 through inverter 37.

Pulse circuit 34 provides a pulse signal similar to input X of FIG. 4c. The pulse signal is used to control the on time of discharge transistor 26 through transistors 30,32. Pulse circuit 34 of this embodiment comprises a three input Nand gate 36, an inverter 38 and delay elements 40,42. Nand gate 36 first input is the enabling input signal for the discharge circuit coming from the logic control circuit of the pre-amp (not shown). The second input is from the first delay element 40 which delays the input by a delay DLY1. The input to delay element 40 is $\overline{Y}$, which is the same driver signal applied to the gate of the H-bridge transistor 24. Y and $\overline{Y}$ control the direction of write current through the write head. The third Nand input is driven by inverter 38. The input to inverter 38 is from delay element 42, which provides a delay of DLY2 added to the delay of delay element 40(DLY1). Delay elements 40,42 may include one or more active or passive devices and may be implemented in a number of ways as is commonly known in the art to achieve a signal delay.

The operation of this circuit is as follows. The pre-amp control circuit first enables the discharge circuit by driving EN high. After a delay of DLY1 once $\overline{Y}$ goes high, the second input to Nand gate 36 goes high. Prior to the propagation of $\overline{Y}$ through delay circuit 42, inverter 38 has a high output to the third input to Nand gate 36. Therefor, output of Nand gate 36 switches low once the second input of Nand gate 36 goes high. This output is connected to inverter 37 which turns on transistor 30 which then turns on transistor 26. After a second delay corresponding to DLY2, the transition on $\overline{Y}$ will propagate through delay element 42 and inverter 38 to drive the third input to Nand gate 36 low and therefore switch the output of Nand gate 36 high and the output of inverter 37 low. Thus the output of inverter 37 is a pulse similar to X shown in FIG. 4c, it has a delay of DLY1 from $\overline{Y}$ and a period of DLY2. Transistor 30 is turned on during the pulse from inverter 37 while transistor 32 is turned off. Then during the pulse, transistor 26 is on and provides a discharge path from the base of transistor 24 to ground, as described above. When the pulse from the delay circuit ends or if the EN signal is not high, Nand gate 36 has a high output which turns off transistor 30 and turns on transistor 32 to turn off the discharge path provided by transistor 26.

Figure 6:
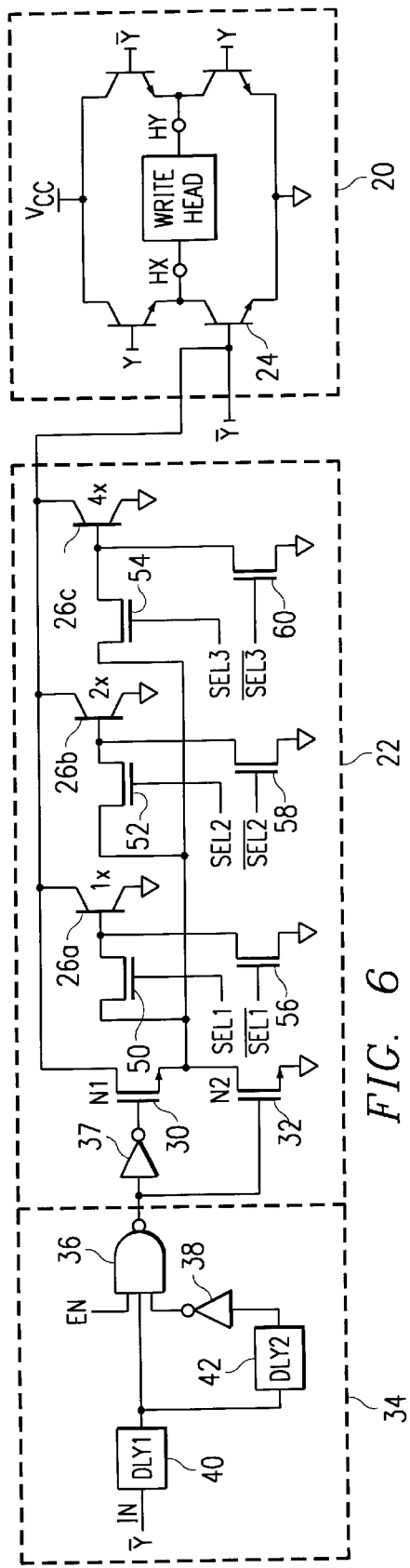
FIG. 6 Shows a selectable overshoot control circuit for a write driver according to an embodiment of the present invention.

Another embodiment of the present invention is illustrated in FIG. 6. This embodiment also includes an H-bridge drive circuit 20 as described above, and a discharge circuit 22. In this embodiment, the discharge circuit 22 includes a series of NPN discharge transistors 26(a–c) with the collectors connected to the base of the H-bridge transistor 24 and the emitters connected to ground. The bases of the NPN transistors 26(a–c) are controlled by an N-MOS transistor pair 30, 32 through a select transistor 50, 52, 54. In this embodiment, the N-MOS transistor pair 30, 32 are connected as in the previous embodiment described above. The base of transistors 30,32 are driven by the pulse circuit as described above. The select transistors 50, 52, 54 enable and disable the drive capability of the N-MOS transistor pair 30,32 to each discharge transistor 26(a–c). Select inputs Sel1, Sel2 and Sel3 from the logic control circuit of the pre-amp connect to the gates of select transistors 50, 52, 54 to selectively enable one or more of the transistors. The size of transistors 26(a–c) can be scaled to provide a range of discharge current. The drain of a second transistor 56, 58, 60 is connected the base of each discharge transistor and the sources connected to ground. The gates of these transistors 56, 58, 60 are connected to the inverted select inputs from logic control to keep the transistors 26(*a–c*) off when they are not enabled.

The embodiment of FIG. 6 has the additional feature of a selectable discharge circuit. The control circuit of the write driver can selectively enable one or more of the transistors 26(*a–b*) to provide a variable discharge current. A write driver circuit typically has a digital to analog converter (DAC) that controls the write current through the write head by controlling the signal value of Y and $\overline{Y}$ on the top or bottom devices of the H-bridge depending on which pair is used to control the steady state head current. The write driver circuit also will typically have a serial input to set the input to the DAC. The select inputs for the discharge circuit can be actuated by the control circuit according to the bits set in the write driver DAC, or the they could be actuated by an independent serial input register or other input external to the write driver. In this manner, the size of the discharge device can be controllably selected. The larger the size of the discharge device, the more discharge current is available. The selection may occur during design of the disk drive, during manufacture, or during operation of the disk drive.

In addition to changing the discharge device size as described above, the duration of the discharge current can be controlled to optimize system performance. The duration of DLY1 and DLY2 could be optimized for a drive current range or be a fixed value, or the duration of DLY1 and DLY2 can be controlled to optimize the overshoot for a given disk drive design or to optimize a single unit at manufacture or during operation. Control of the duration could be as described above with control of the discharge current, that is it could be controlled using the write driver DAC or could be controlled independently. The period of DLY1 and DLY2 could be proportional to value of the steady state write head current controlled by the pre-amp DAC. In another embodiment, the duration and the discharge current are both controlled to give a broad control of the overshoot.

Figure 7:
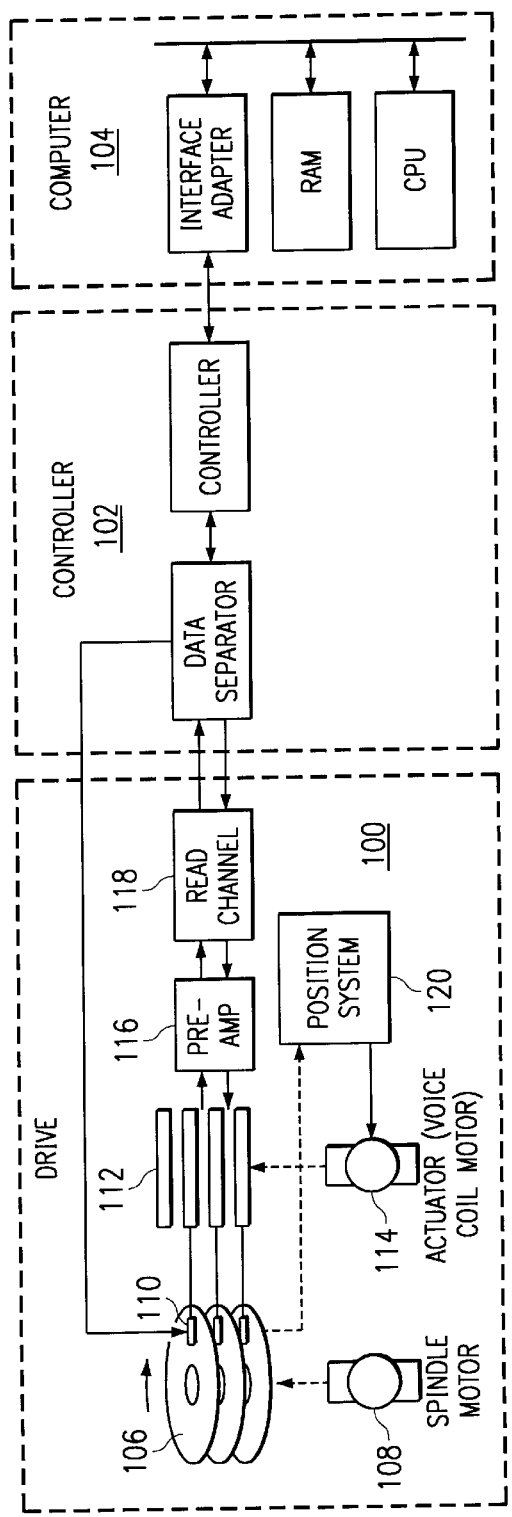
FIG. 7 Represents a HDD system level view of an embodiment of the present invention.

FIG. 7 represents a HDD system level view of the present invention. The hard disk drive 100 is connected to a computer 104 through a controller 102. The hard disk drive 100 has disk platters 106, which are driven by motor 108 to rotate as shown. Read and write heads 110 move upon an actuator mechanism 112 driven by a voice coil motor 114. Data detected by the heads is passed through the pre-amp 116 and then a read channel 118 and also used to provide feedback to the head actuator position system 120. Data signals from the HDD are fed to the controller 102 which is then passed to the computer 104. The present invention concerns improvements to the head drive circuitry in the pre-amp 116 as discussed above.

An advantage of the present invention is the manufacturer of the HDD can optimize the performance of the head by using the selectable nature of the current overshoot. Optimization could be done for a particular disk drive design, for a specific drive during burn-in, or "on the fly" when the head is accessing different tracks or sections of the disk platter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments. For example, while NPN transistors are shown as a preferred embodiment, other transistor types such as nmos transistors are also contemplated by the current invention. The discharge circuit could also be incorporated with the top H-bridge transistors.

What is claimed is:

1. A hard disk drive for a computer system comprising:
  a. one or more platters having magnetic media on one or more surfaces;
  b. a write head associated with at least one of said surfaces having magnetic media;
  c. an H-bridge circuit capable of driving a current through said write head, said H-bridge circuit comprising two upper transistors and two lower transistors; and
  d. a discharge circuit connected to at least one of said transistors to discharge the base/gate drive of said at least one transistor, which ultimately decreases that transistors drive current during a period when the current is reversed through the write head.

2. The hard disk drive of claim 1 wherein said discharge circuit discharges the base/gate drive after said current through said head reaches a predetermined level.

3. The hard disk drive of claim 1 wherein said discharge circuit comprises at least one discharge transistor connected to a base/gate of said lower transistors on said H-bridge and means for driving said discharge transistor during a period of overshoot of said current through said write head.

4. The hard disk drive of claim 3 wherein said discharge circuit comprises a pulse circuit which turns on said discharge transistor after a first delay from the turning on of the lower transistor and turns off said discharge transistor after a second delay.

5. The hard disk drive of claim 4 wherein at least one of said first and second delay period is selectably controlled.

6. The hard disk drive of claim 4 further comprising a DAC to control the write current through the head, and wherein at least one of said first and second delay period is proportional to the DAC write current.

7. The hard disk drive of claim 1 further comprising a plurality of discharge transistors connected in parallel with the gates of said plurality of transistors having a select transistor with a select input at a gate input, with the gate inputs connected to means for enabling one or more of the select transistors.

8. The hard disk drive of claim 3 further comprising a plurality of discharge transistors connected in parallel with the gates of said plurality of transistors having a select transistor with a select input at a gate input, with the gate inputs connected to means for enabling one or more of the select transistors.

9. An integrated circuit for driving a write head of a hard disk drive comprising:
  a. an H-bridge circuit capable of driving a current through said write head, said H-bridge circuit comprising two upper transistors and two lower transistors; and
  b. a discharge circuit connected to at least one of said transistors to discharge the base/gate drive of said at least one transistor and wherein said discharge circuit discharges the base/gate drive after said current through said head reaches an overshoot condition.

10. The integrated circuit of claim 9 wherein said discharge circuit discharges the base/gate drive after said current through said head reaches a predetermined level.

11. The integrated circuit of claim 9 wherein said discharge circuit comprises at least one discharge transistor connected to a base/gate of said lower transistors on said H-bridge and means for driving said discharge transistor during a period of overshoot of said current through said write head.

12. The integrated circuit of claim 11 wherein said discharge circuit comprises a pulse circuit which turns on said discharge transistor after a first delay from the turning on of the lower transistor and turns off said discharge transistor after a second delay.

13. The integrated circuit of claim 12 wherein at least one of said first and second delay period is selectably controlled.

14. The integrated circuit of claim 12 further comprising a DAC to control the write current through the head, and wherein at least one of said first and second delay period is in proportion to the DAC write current.

15. The integrated circuit of claim 9 further comprising a plurality of discharge transistors connected in parallel with the gates of said plurality of transistors having a select transistor with a select input at a gate input, with the gate inputs connected to means for enabling one or more of the select transistors.

16. The integrated circuit of claim 12 further comprising a plurality of discharge transistors connected in parallel with the gates of said plurality of transistors having a select transistor with a select input at a gate input, with the gate inputs connected to means for enabling one or more of the select transistors.

17. The integrated circuit of claim 14 further comprising a plurality of discharge transistors connected in parallel with the gates of said plurality of transistors having a select transistor with a select input at a gate input, with the gate inputs connected to means for enabling one or more of the select transistors.

* * * * *